United States Patent
Murota

(10) Patent No.: US 9,511,462 B2
(45) Date of Patent: Dec. 6, 2016

(54) ATTACHMENT STRUCTURE FOR MAIN SPINDLE AND TOOL HOLDER OF MACHINE TOOL

(71) Applicant: FANUC Corporation, Yamanashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 26 days.

(21) Appl. No.: 14/502,299

(22) Filed: Sep. 30, 2014

(65) Prior Publication Data

US 2015/0093209 A1    Apr. 2, 2015

(30) Foreign Application Priority Data

Oct. 1, 2013 (JP) ................. 2013-206469

(51) Int. Cl.
*B23Q 5/04* (2006.01)
*B23Q 11/10* (2006.01)
*B23B 31/26* (2006.01)

(52) U.S. Cl.
CPC ............. *B23Q 5/04* (2013.01); *B23B 31/263* (2013.01); *B23Q 11/1015* (2013.01); *B23B 2260/126* (2013.01); *Y10T 408/455* (2015.01); *Y10T 409/304032* (2015.01); *Y10T 409/309464* (2015.01)

(58) Field of Classification Search
CPC .......... B23B 2260/126; B23B 31/263; B23B 2231/0296; B23Q 11/1015; B23Q 5/04; Y10T 408/76; Y10T 408/907; Y10T 408/94; Y10T 408/957; Y10T 408/95; Y10T 409/304312; Y10T 409/30952; Y10T 409/309408

USPC ............... 408/143, 226, 238, 239 R, 239 A; 409/234, 232, 141

See application file for complete search history.

(56) References Cited

U.S. PATENT DOCUMENTS

| | | | | |
|---|---|---|---|---|
| 2,933,321 A * | 4/1960 | Cascone | .............. | B23Q 1/0036 279/20 |
| 3,240,503 A * | 3/1966 | Watson | ............... | B23B 31/1175 269/20 |
| 3,806,272 A * | 4/1974 | Muller | ..................... | B23Q 1/70 408/20 |
| 5,246,414 A * | 9/1993 | Hallbach | ................ | B23Q 11/08 409/134 |
| 5,342,155 A * | 8/1994 | Harroun | ................ | B23B 31/006 408/240 |
| 5,439,333 A * | 8/1995 | Kubo | ................... | B23Q 11/103 408/57 |
| 5,595,391 A * | 1/1997 | Rivin | .................... | B23B 31/006 279/103 |

(Continued)

FOREIGN PATENT DOCUMENTS

JP    01-92345 U    6/1989
JP    3-55106 U    5/1991

(Continued)

OTHER PUBLICATIONS

Office Action mailed Feb. 24, 2015, corresponding to Japanese patent application No. 2013-206469.

*Primary Examiner* — Daniel Howell
*Assistant Examiner* — Nicole N Ramos
(74) *Attorney, Agent, or Firm* — Hauptman Ham, LLP

(57) ABSTRACT

There is provided an attachment structure for a main spindle and a tool holder of a machine tool. The tool holder is attached to the main spindle by a tapered shank portion of the tool holder being inserted into a tapered hole formed in the main spindle of the machine tool. At least one circumferential groove is formed in at least one of the tapered hole and an inner wall of the main spindle.

3 Claims, 3 Drawing Sheets

(56) References Cited

U.S. PATENT DOCUMENTS

| | | | | |
|---|---|---|---|---|
| 5,716,173 | A | * | 2/1998 | Matsumoto ............ B23B 31/006 408/239 A |
| 5,775,857 | A | * | 7/1998 | Johne .................... B23B 31/005 279/143 |
| 6,382,888 | B2 | * | 5/2002 | Cook ...................... B23B 31/02 279/103 |
| 6,779,955 | B2 | * | 8/2004 | Rivin ..................... B23B 31/006 188/379 |
| 6,808,342 | B2 | * | 10/2004 | Kress ................. B23Q 11/1023 408/59 |
| 7,371,036 | B2 | * | 5/2008 | Buttau .................. B23B 31/028 279/4.03 |
| 2003/0103828 | A1 | * | 6/2003 | Kitaura ................ B23B 31/117 409/234 |
| 2006/0131822 | A1 | * | 6/2006 | Lindstrom ............ B23B 31/208 279/53 |
| 2008/0260483 | A1 | * | 10/2008 | Cook .................... B23B 31/006 409/141 |

FOREIGN PATENT DOCUMENTS

| | | | |
|---|---|---|---|
| JP | 10094942 A | * | 4/1998 |
| JP | 10180509 A | * | 7/1998 |
| JP | 11090708 A | * | 4/1999 |
| JP | 2000-158214 A | | 6/2000 |
| JP | 2002011638 A | * | 1/2002 |
| KR | 2001036991 A | * | 5/2001 |

* cited by examiner

ATTACHMENT STRUCTURE FOR MAIN SPINDLE AND TOOL HOLDER OF MACHINE TOOL

RELATED APPLICATIONS

The present application claims priority to Japanese Application Number 2013-206469, filed Oct. 1, 2013, the disclosure of which is hereby incorporated by reference herein in its entirety.

BACKGROUND OF THE INVENTION

1. Field of the Invention

The present invention relates to an attachment structure for the main spindle and the tool holder of a machine tool.

2. Description of the Related Art

A machine tool typically has a tool clamping mechanism for securing a tool holder to the main spindle in a removable manner. The tool clamping mechanism generates force for gripping the tool holder using a spring or the like. FIG. 3 generally illustrates a conventional tool clamping mechanism, which includes a main spindle 1, a drawbar shaft 3, a tool holder 7, and a spring 16. The drawbar shaft 3 is inserted in the main spindle 1 with the spring 16 interposed between them.

A machine tool also includes a structure to supply high-pressure cutting fluid from the tip of the tool to a machining point, which is where the tool attached to the tool holder contacts the workpiece, in order to improve machining performance. Such a structure includes a pump for feeding high-pressure cutting fluid in order to supply high-pressure cutting fluid to the machining point from the tip of the tool, with a through hole formed in the main spindle and/or the tool holder through which cutting fluid flows.

Action of the high-pressure cutting fluid on a tapered portion and/or a pull stud of the tool holder generates force in a direction that decreases the force with which the tool clamping mechanism grips the tool holder. If the pressure of the cutting fluid becomes high, cutting fluid penetrates between the tapered hole of the main spindle and the tapered portion of the tool holder, causing a change in the distance between the tapered hole of the main spindle and the tapered portion of the tool holder. Such a change in the distance between the tapered hole of the main spindle and the tapered portion of the tool holder can affect the machining accuracy.

As solutions to this problem, some structures have been proposed. For instance, Japanese Utility Model Application Laid-Open No. 1-92345 discloses two types of structure as attachment structures for the main spindle and a tool attachment portion of a machine tool. One of the attachment structures has a sealing mechanism formed of a sealing element in the tapered portion of the tool holder. The other attachment structure realizes a sealing mechanism by providing an annular component having a groove formed in the circumferential direction in the inner surface of the main spindle's accommodating hole and providing a sealing element on the annular component.

The former attachment structure disclosed by Japanese Utility Model Application Laid-Open No. 1-92345, i.e., with a sealing mechanism formed of a sealing element in the tapered portion of the tool holder, is complicated and expensive because a sealing element need to be provided in the tapered portion of each tool holder.

The latter structure disclosed by Japanese Utility Model Application Laid-Open No. 1-92345, i.e., the one realizing a sealing mechanism by providing an annular component having a groove formed in the circumferential direction in the inner surface of the main spindle's accommodating hole and providing a sealing element on the annular component, is also complicated and expensive due to the necessity to separately prepare the annular component.

SUMMARY OF THE INVENTION

In view of such circumstances, an object of the present invention is to provide a structure for the main spindle and the tool attachment portion with an inexpensive sealing mechanism.

According to the present invention, an attachment structure for a main spindle and a tool holder of a machine tool is provided. The tool holder is attached to the main spindle by a tapered shank portion of the tool holder being inserted into a tapered hole formed in the main spindle of the machine tool. At least one circumferential groove is formed in at least one of the tapered hole and an inner wall of the main spindle.

By thus forming a circumferential groove in at least one of the tapered hole and the inner wall of the main spindle, there is no need to form a circumferential groove in each tool holder or provide a separate annular component, enabling a sealing mechanism to be realized easily and at low costs.

A sealing element may be provided in the circumferential groove.

By thus providing a sealing element, such as an O-ring or U-packing, in the circumferential groove, sealing effects can be further enhanced easily and at low costs.

With these features, the present invention can provide a structure for the main spindle and the tool attachment portion having an inexpensive sealing mechanism.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

First Embodiment

Figure 1:
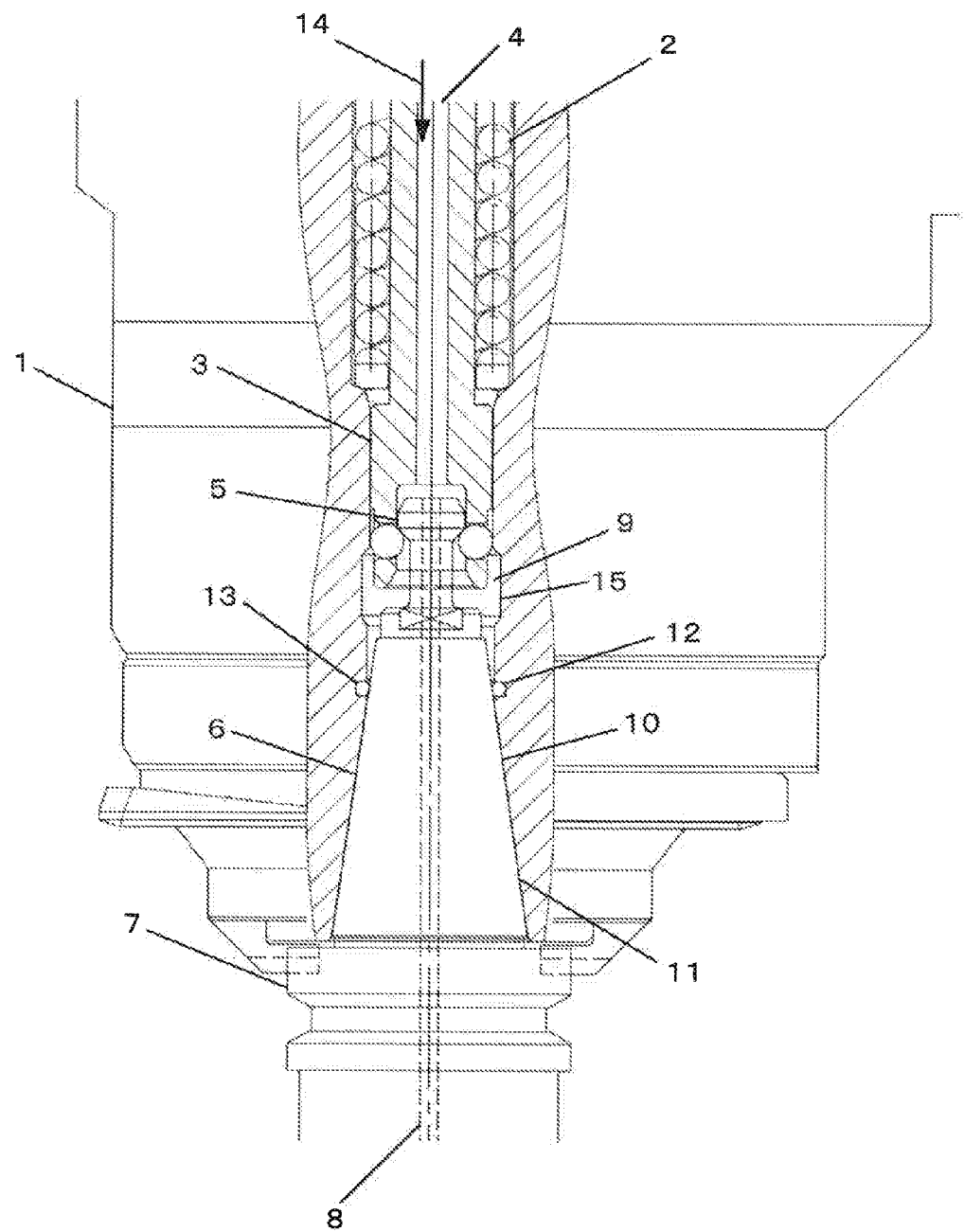
FIG. 1 shows a structure of a main spindle and a tool attachment portion in a first embodiment of the invention.

FIG. 1 shows a structure of a main spindle and a tool attachment portion in the first embodiment of the invention. A tool clamping mechanism 2 is disposed inside a main spindle 1. The tool clamping mechanism 2 includes a drawbar shaft 3 as a component thereof, and a through hole 4 for feeding cutting fluid is formed in the drawbar shaft 3. The tool clamping mechanism 2 grips a tool holder 7, which is composed of a pull stud 5 and a tool shank 6. The pull stud 5 and the tool shank 6 have a through hole 8 therein for feeding cutting fluid.

Cutting fluid supplied from the rear of the main spindle 1 by a high pressure pump (not shown) passes through the through hole 4 in the drawbar shaft 3 to be fed into space 9 in the main spindle from the end of the drawbar shaft 3. The cutting fluid fed into the space 9 in the main spindle passes through the through hole 8 in the tool holder 7 to be ejected from the tip of the tool.

The cutting fluid fed into the space 9 in the main spindle from the end of the drawbar shaft 3 tends to enter a minute gap formed in the interface between a tapered hole 10 of the main spindle 1 and a tapered portion 11 of the tool holder 7. In order to address this, a groove 12 is formed in the circumferential direction at a certain point on the tapered hole 10 of the main spindle 1, and a sealing element 13 is provided inside the circumferential groove 12.

Above mentioned structure prevents the cutting fluid from entering from the point of the circumferential groove 12 toward the tool side along the tapered portion 11 of the tool holder 7. Consequently, the range in which cutting fluid acts on the tool holder 7 becomes narrow and force acting in the direction that decreases the force generated by the tool clamping mechanism 2 for gripping the tool holder 7 reduces, so that firm clamping of the main spindle 1 and the tool holder 7 can be maintained in favorable state.

In addition, since ingress of cutting fluid between the tapered hole 10 of the main spindle 1 and the tapered portion 11 of the tool holder 7 is prevented by the sealing element 13, no variation occurs in the distance between the tapered hole 10 of the main spindle 1 and the tapered portion 11 of the tool holder 7 upon variations in machining load. This can maintain firm clamping of the main spindle 1 and the tool holder 7 and also stabilize machining performance and/or accuracy.

While in this embodiment the circumferential groove 12 is formed at a certain point on the tapered hole 10 of the main spindle 1 and the sealing element 13 is provided inside the circumferential groove 12, only the circumferential groove 12 may be provided without the sealing element 13. Since cutting fluid can still collects in the circumferential groove 12 in such a configuration, cutting fluid is prevented from entering from the point of the circumferential groove 12 toward the tool side along the tapered portion 11 of the tool holder 7.

Second Embodiment

Figure 2:
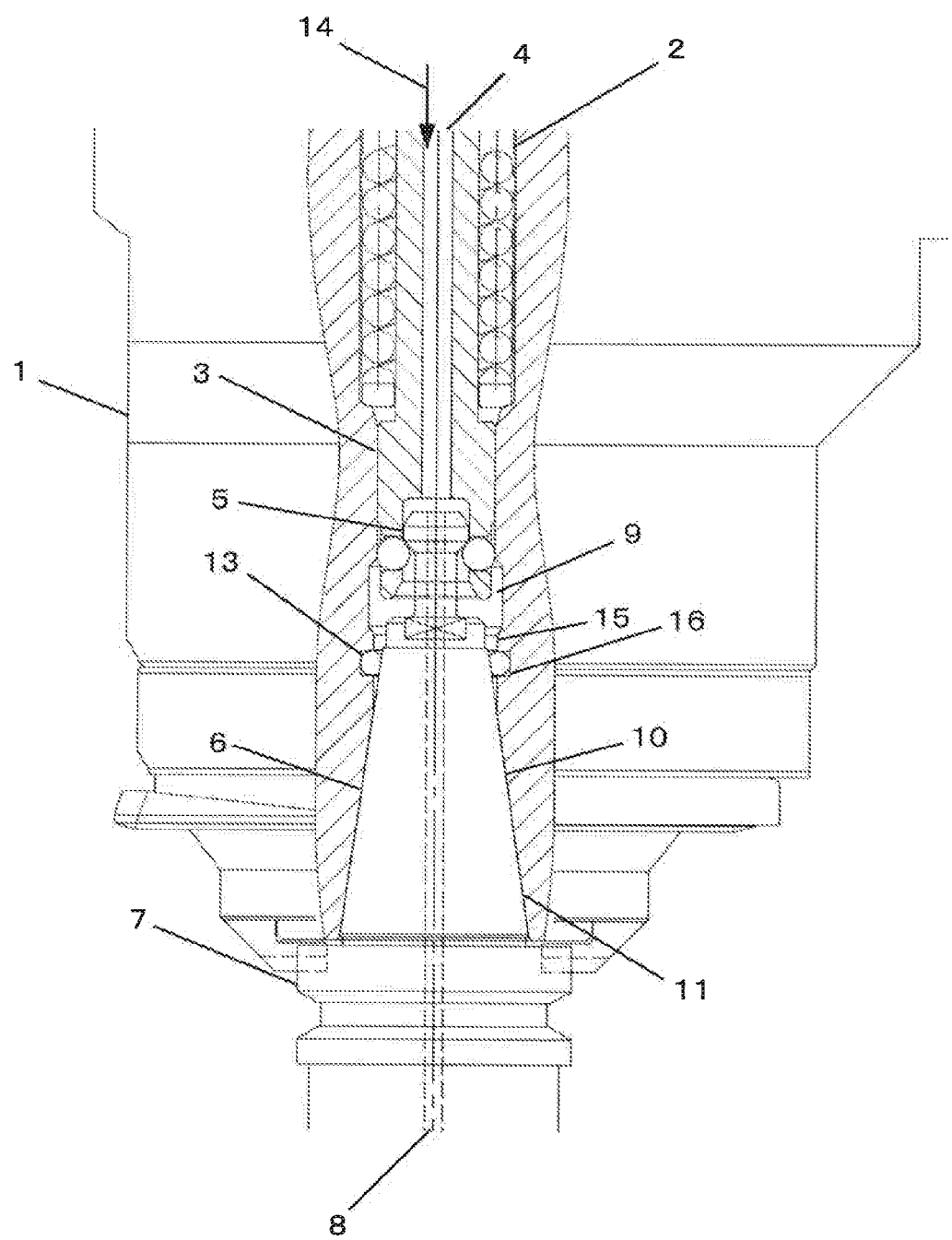
FIG. 2 shows a structure of a main spindle and a tool attachment portion in a second embodiment of the invention.
Figure 3:
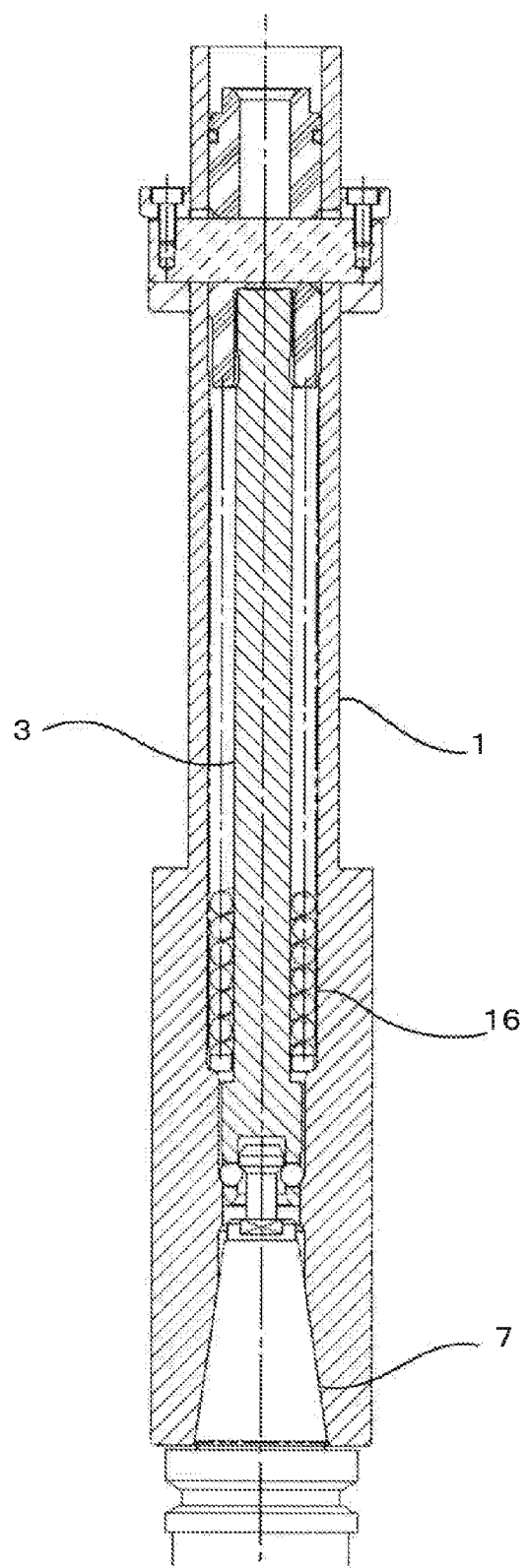
FIG. 3 generally illustrates a conventional tool clamping mechanism.

FIG. 2 shows a structure for the main spindle and the tool attachment portion in the second embodiment of the invention. The second embodiment differs from the first embodiment in that a circumferential groove 12 and a sealing element 13 are provided in an inner wall 15 of the main spindle instead of in the tapered hole 10 of the main spindle. As in the first embodiment, force acting in the direction that decreases the force generated by the tool clamping mechanism 2 for gripping the tool holder 7 also reduces in this configuration, so firm clamping of the main spindle 1 and the tool holder 7 can be maintained and machining performance and/or accuracy are stabilized.

Also in this embodiment, only the circumferential groove 12 may be provided without the sealing element 13. Since cutting fluid can still collects in the circumferential groove 12 in such a configuration, cutting fluid is prevented from entering from the point of the circumferential groove 12 toward the tool side along the tapered portion 11 of the tool holder 7.

The circumferential groove 12 may be provided both in the tapered hole 10 and inner wall 15 of the main spindle. While the illustrated embodiments provide only one circumferential groove 12 and only one sealing element 13, two or more circumferential grooves 12 and sealing elements 13 may be provided.

The invention claimed is:

1. An attachment structure, comprising a main spindle and a tool holder of a machine tool, wherein
   the tool holder has
      a tapered shank portion having a smaller end and a larger end opposite each other in an axial direction of the tool holder, the tapered shank portion gradually tapered from the larger end to the smaller end, and
      a first through hole extending in the axial direction through the tapered shank portion,
   the main spindle has
      a tapered hole, and
      a second through hole communicated with the tapered hole,
   the tool holder is attached to the main spindle in a state in which
      the tapered shank portion of the tool holder is inserted, in the axial direction, into the tapered hole formed in the main spindle of the machine tool, and
      the first through hole is communicated with the second through hole to form a passage for a cutting fluid, and
   the attachment structure further comprises:
      a circumferential groove formed (i) in an inner wall of the main spindle and (ii) outside the tapered hole,
         wherein the circumferential groove is arranged, in the axial direction, between the tapered hole and the smaller end of the tapered shank portion.

2. The attachment structure according to claim 1, further comprising:
   a sealing element provided in the circumferential groove.

3. The attachment structure according to claim 1, wherein the circumferential groove is empty without containing a sealing element.

* * * * *